Figure 8:
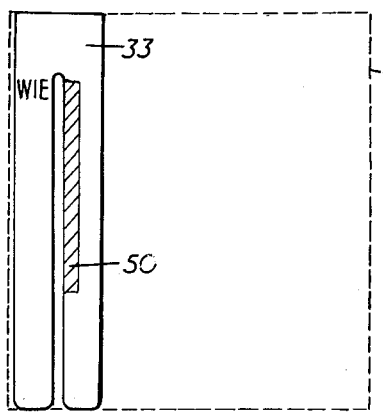

May 14, 1963     J. J. KAVANAGH ETAL     3,089,258
DEVICE FOR INTERPRETATION AND TRANSLATION OF LANGUAGES
Filed Jan. 4, 1960     6 Sheets-Sheet 1
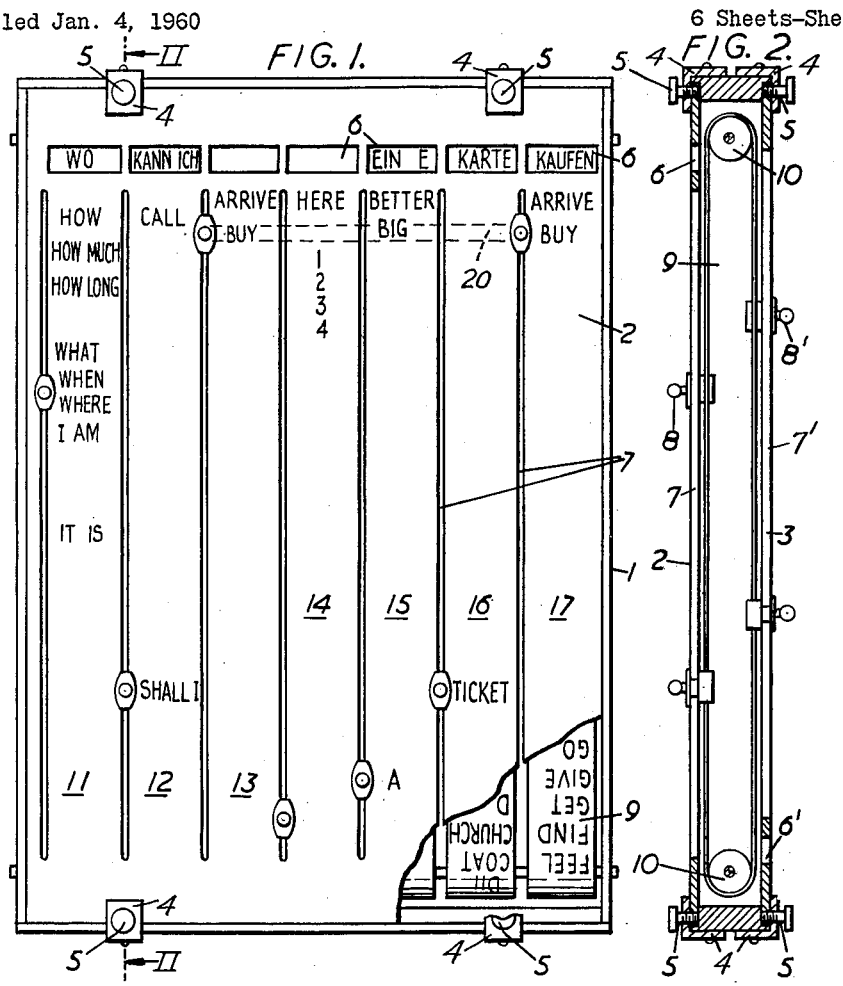
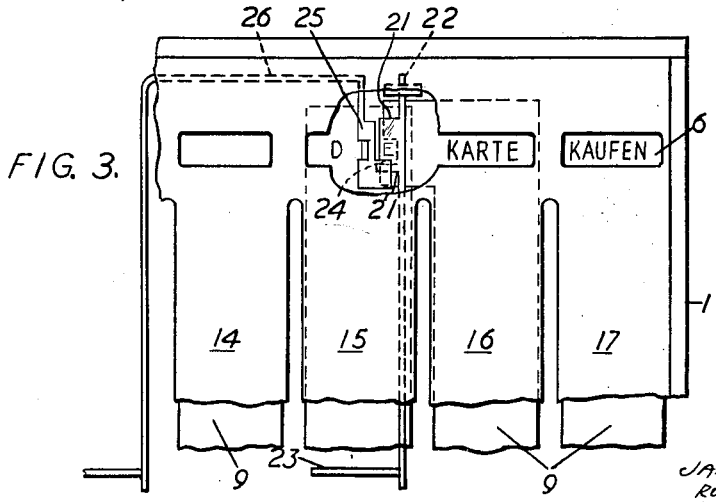
Inventors
JAMES JOSEPH KAVANAGH
ROBERT KAVANAGH
GERARD KAVANAGH
By Irwin B. Thompson
Attorney

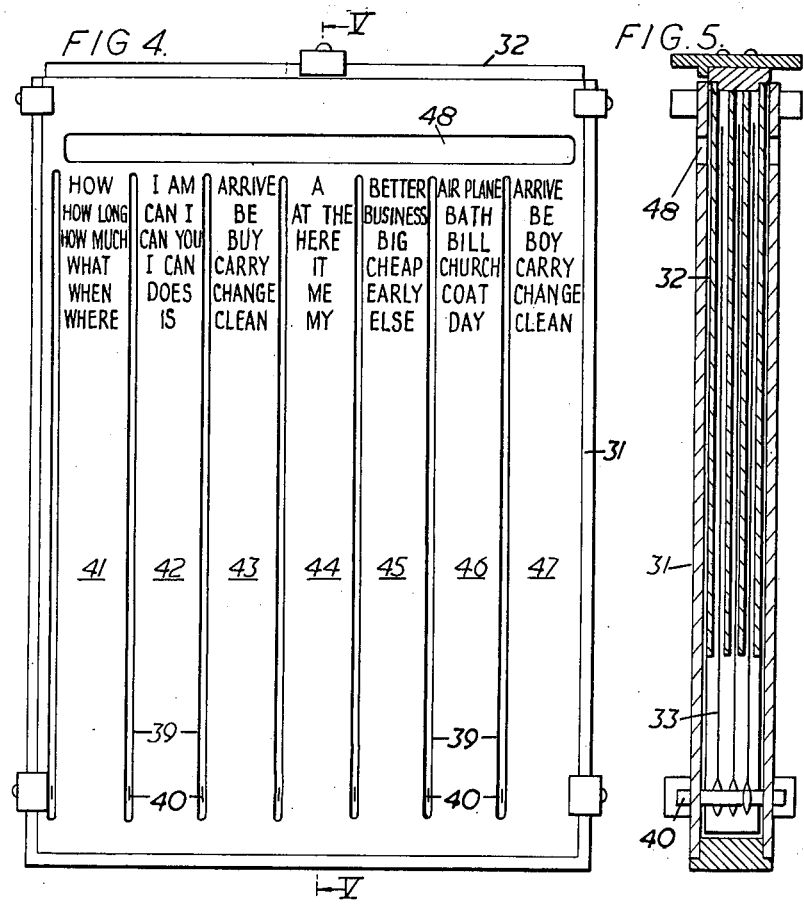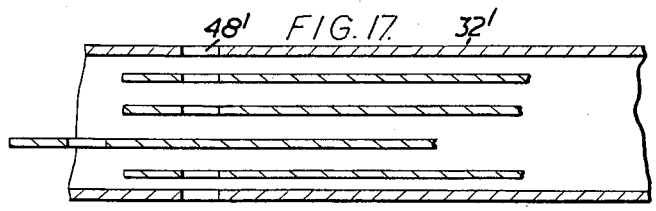

May 14, 1963     J. J. KAVANAGH ETAL     3,089,258
DEVICE FOR INTERPRETATION AND TRANSLATION OF LANGUAGES
Filed Jan. 4, 1960     6 Sheets-Sheet 3
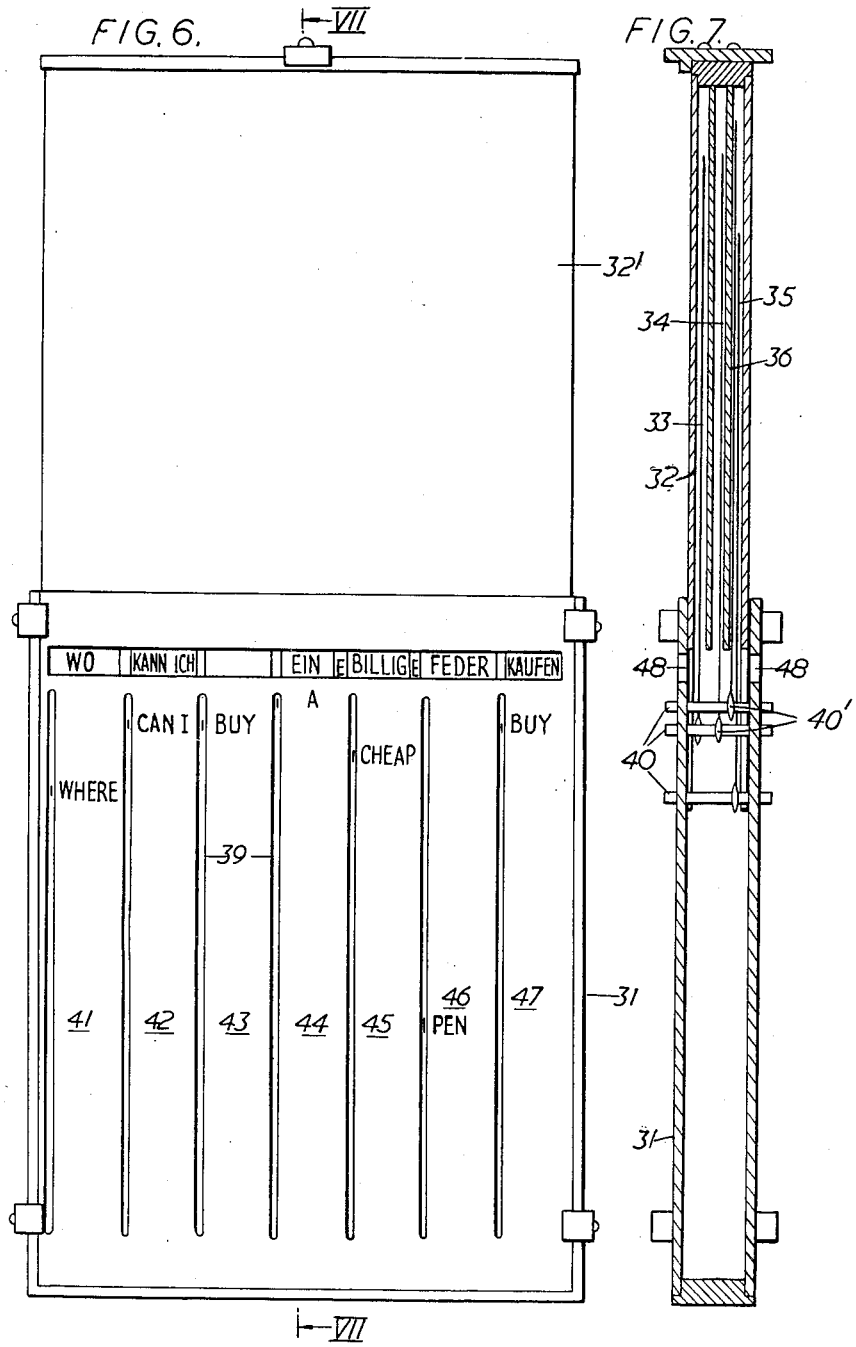
Inventors
JAMES JOSEPH KAVANAGH
ROBERT KAVANAGH
GERARD KAVANAGH
Attorney

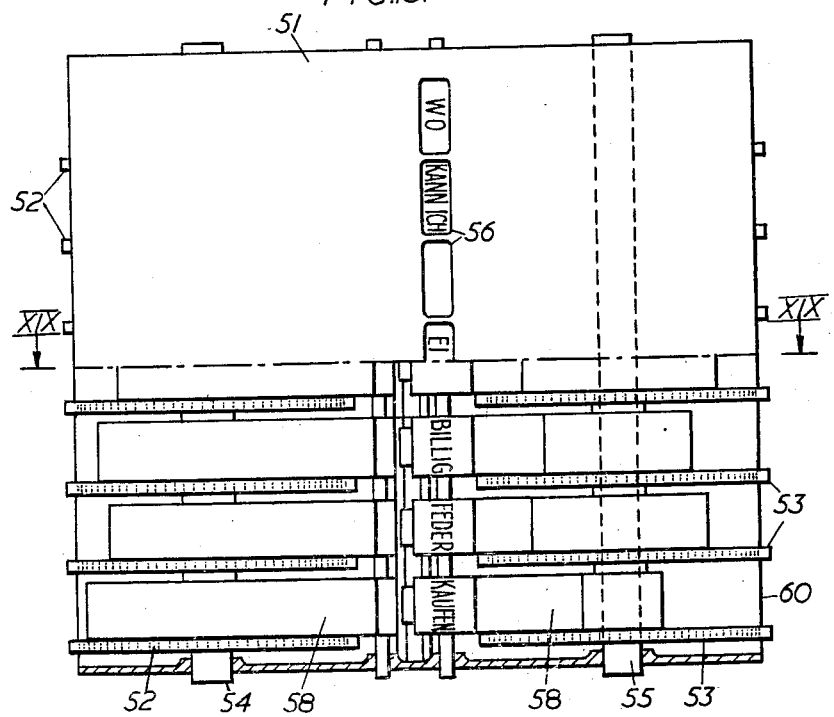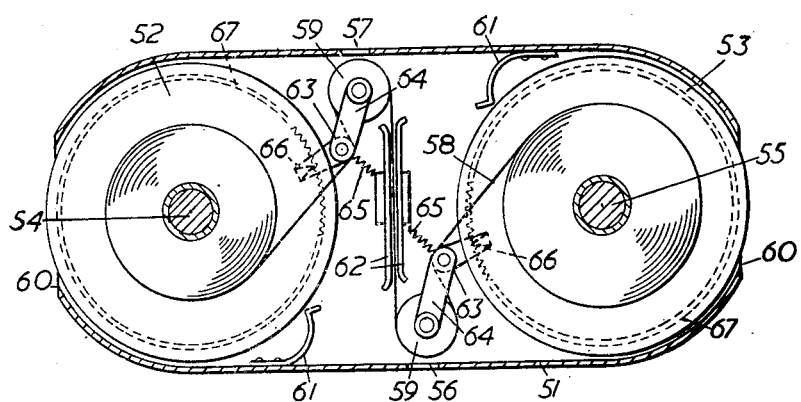

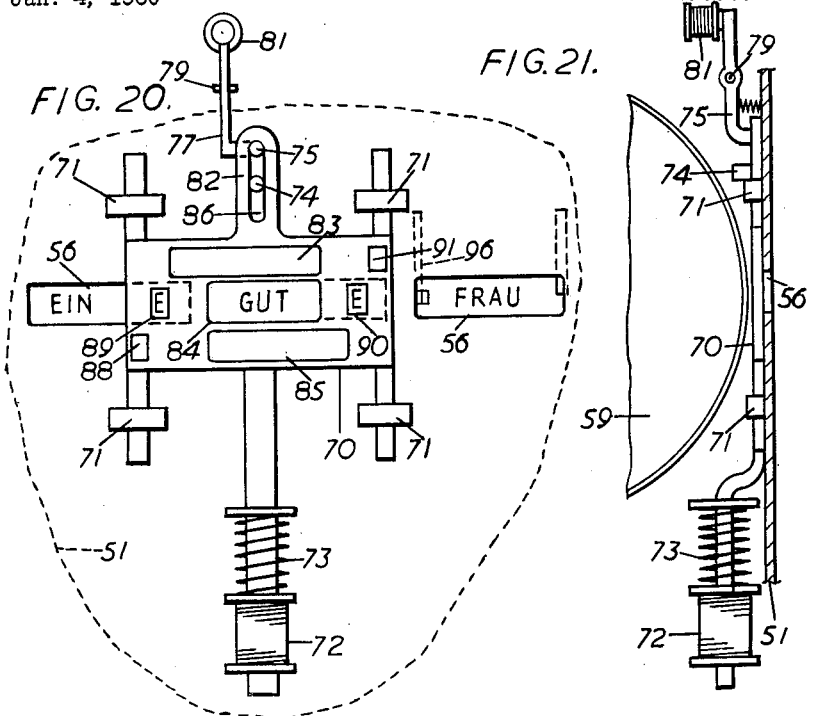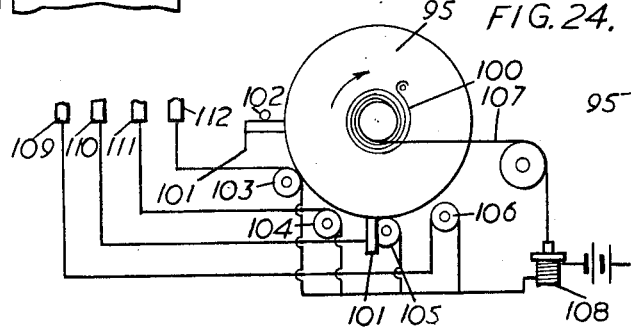

United States Patent Office 3,089,258
Patented May 14, 1963

3,089,258
DEVICE FOR INTERPRETATION AND TRANS-
LATION OF LANGUAGES
James J. Kavanagh, Robert Kavanagh, and William
Gerard Kavanagh, Arklow, Ireland, assignors, by direct
and mesne assignments, to Ferenc J. Schmidt, Berwyn,
Pa.
Filed Jan. 4, 1960, Ser. No. 361
6 Claims. (Cl. 35—35)

This invention relates to devices for use in interpreting and in translating words and phrases from one language into another. The expressions "translation" and "interpretation" are used interchangeably in the following description for the sake of brevity.

An object of the invention is to provide a device which is simple to construct and easy to operate for the rapid translation of selected words from one language into another language, and for translating phrases by freely combining the selected words to form corresponding phrases in another language. A further object is to provide for the immediate reversal of these processes so that the device permits the substantially continuous interchange of information orally or visually in at least two languages. The device may also be adapted to deal with more than two languages, and may be arranged to indicate both the normal spelling and the phonetic equivalent of the various words translated. The invention may also afford a convenient means of communication with deaf and/or dumb persons.

Fundamentally the device according to the invention comprises a casing having a series of apertures or equivalent transversely aligned, a corresponding series of elements bearing columns of words in a language "A" and movable longitudinally relatively to the casing so as to bring said words successively into registration with the aperture respectively corresponding thereto, a further series of columns of words in a language "B", being translations or equivalents of the words in the columns of language "A" and arranged in similar order thereto, mounted either upon the casing or on the longitudinally movable elements in addition to those of language "A", the arrangement being such that upon moving the longitudinally movable elements to bring selected words of one language into indicated positions, corresponding words in the other language are also indicated in a predetermined manner, i.e., by being brought into registration with said apertures. If language "A" and language "B" are the same the device can be used as a means of "conversation" with or between deaf and/or dumb persons.

The longitudinally movable elements may take the form of slides, endless bands passing over rollers, strips which may be wound from one roller to another, or they may be constituted by the peripheral portion of rotatable discs or cylinders. They may be moved into desired position manually, mechanically or electrically or by combinations thereof, while visual aids, such as optical projection, illumination and colour filtration may be used to display the selected words or their equivalents.

The device may be arranged to indicate the translation of words in their normal spelling and/or their phonetic equivalent. Moreover, the movable elements may be changeable either for the purpose of extending the range of vocabulary which the device may use or to enable the device to translate different languages.

According to a further feature of the invention two or more of the movable elements adjacent or otherwise, may be coupled together (or a single movable element arranged to carry two or more columns of words spaced apart laterally) in order to enable the device to deal with two languages in one of which the word-order is not the same as in the other language. Also movable masking means may be provided to enable the device to deal with variations such as gender, declensions and inflections. In some cases one of the movable elements may be formed as a mask for another of the movable elements.

Figure 11:
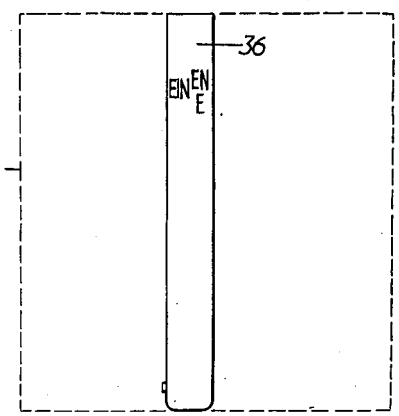
Figure 9:
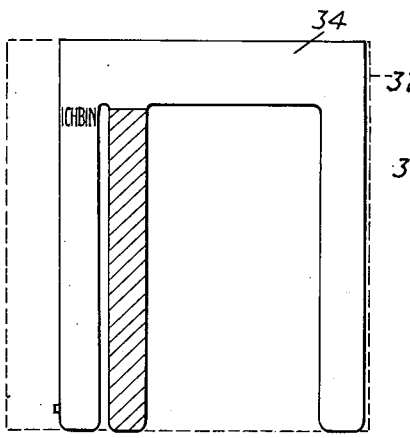
Figure 12:
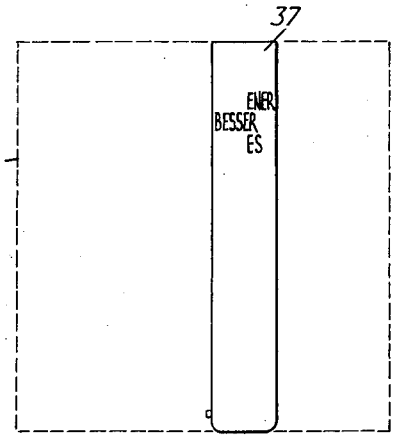
Figure 10:
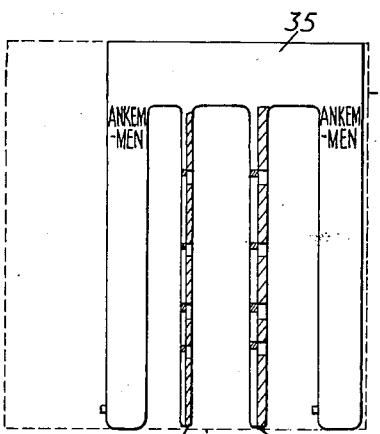
Figure 13:
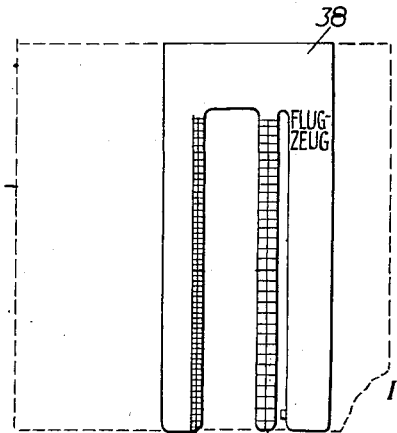

A number of constructional forms of the translation device according to the invention are shown in the accompanying drawings, wherein:

FIG. 1 is an elevation of the device in a relatively simple form,
FIG. 2 is a cross-section on line II—II of FIG. 1,
FIG. 3 is an enlarged view of a portion of FIG. 1,
FIG. 4 is an elevation of a further constructional form of the device in closed position,
FIG. 5 is a cross-section on line V—V of FIG. 4,
FIG. 6 is an elevation of the device shown in FIG. 4 in open position,
FIG. 7 is a cross-section on line VII—VII of FIG. 6,
FIGS. 8 to 13 show respectively in elevation the six longitudinally slidable elements employed in the device shown in FIGS. 4 to 7,
FIGS. 14, 15 and 16 are enlarged views of a detail and are more or less diagrammatic,
FIG. 17 shows in cross-section a portion of a further modified form of the device,
FIG. 18 is an elevation, partly in section of a further constructional form which the device according to the invention may take,
FIG. 19 is a sectional plan of FIG. 18, corresponding substantially to line XIX—XIX of FIG. 18,
FIG. 20 is an enlarged detail view of an electromagnetically operated device whereby inflections due to changes of gender may be taken into consideration, for example in the device constructed as shown in FIGS. 18 and 19,
FIG. 21 is a side elevation corresponding to FIG. 20,
FIG. 22 is a diagram showing the lettering of portions of the device shown in FIG. 20,
FIG. 23 is a side elevation similar to FIG. 21,
FIG. 24 shows more or less diagrammatically electromagnetic means for taking into consideration inflections due to variations of case in conjunction with the gender-changing device shown in FIGS. 20 and 21, and
FIG. 25 is a flat development of a cylinder of FIG. 24.

In the drawings corresponding parts are indicated by similar reference numerals in all the views.

Referring to FIGS. 1 to 3, the construction of the translation device represented therein comprises a substantially flat elongated case 1, the front 2 and back 3 of which are removable, said parts being conveniently held together by removable angle-pieces 4 carrying feet 5 which serve to raise the casing 1 from any flat surface on which it may be laid.

Both the front 2 and back 3 are formed with transversely aligned series of apertures 6, 6' and longitudinal slots 7, 7'. Through each slot projects a pin 8 or 8' which is attached to an endless band 9 passing around rollers 10 rotatably mounted at opposite ends of the casing 1.

Upon the front 2 of the casing, adjacent to the respective slots 7 are marked columns of words 11, 12, 13, 14, 15, 16 and 17 in a language "A". Seven such columns and slots are shown in the drawing, this being the preferred number, but a greater or lesser number may be provided if desired without departing from the invention. In the drawing only a few words in each column are depicted, and it will be understood that the words in question are chosen according to judgement when making the device and may depend upon the particular use for which the device is intended, e.g., for the use of a traveler, in which case the words chosen will be those most frequently required for use in enquiries as to transport, reservations, direction and so forth.

In the example shown the respective columns are devoted mainly to different kinds of words, such as:

Column 11—interrogatories and words which commonly open phrases.

Column 12—further words of command and enquiry, and verbal auxiliaries.

Column 13—verbs.

Column 14—pronouns, numbers, adverbs.

Column 15—articles, adjectives.

Column 16—nouns.

Column 17—verbs.

The words are arranged alphabetically or in any chosen order, e.g., according to subject matter. Columns 13 and 17 are identical, the device being adapted for use with a language, such as German, in which verbs are frequently transposed in order.

The bands 9 disposed beneath the respective columns 11 to 17 bear the same words (in a language "B") as those in the column immediately above in language "A", and the pin 8 connected to each band 9 is so disposed that if said pin is moved along a slot and brought to rest adjacent to any selected word, the band 9 to which the pin is attached is moved to bring the same word (but in language "B") into view in the aperture 6 at the head of the column in question.

The bands located beneath columns 13 and 17 are directly connected by cross members 20 and therefore move together, so that the same word will be brought into registration with the aperture 6 at the head of both column 13 and column 17, but the aperture 6 appertaining to column 13 is masked so that the word in question is displayed only in the aperture appertaining to column 17.

FIG. 1 illustrates by way of example the manner in which the phrase "Where shall I buy a ticket?" may be translated into the German phrase "Wo werde Ich ein(e) Karte kaufen?", the pins 8 appertaining to columns 11, 12, 13, 15 and 16 being respectively disposed adjacent to the words "WHERE", "SHALL I", "BUY", "A", and "TICKET" in those columns. The aperture 6 at the head of column 14 appears blank as the pin 8 appertaining to that column is in a neutral or inoperative position at the lower end of its slot 7.

The indefinite article "a" in column 15 is capable of inflection in the German language according to the gender of the noun which follows it. This may be readily taken care of by providing a marginal extension upon the band appertaining to column 16 so that it overlaps the band 9 appertaining to column 15, but is provided with a window or notch 24 positioned so as to display the appropriate terminal for the gender of the noun adjacent thereto on the band appertaining to column 16.

Where this terminal must be varied according to the word in column 15 that is selected, i.e., if the terminal of the definite article is not the same as that of the indefinite article, the terminal may be changed accordingly by means shown more clearly in FIG. 3. This comprises a displaceable member 21, part of which is transparent and part opaque mounted upon a rod 22 which has limited longitudinal sliding movement upon the casing front 2. In one extreme position the opaque portion of the member 21 acts as a mask for part of the marginal portion of the band 9 carrying alternative terminal letters, while in the other extreme position it uncovers same but obscures an adjacent part of said marginal portion bearing further alternative terminal letters. The rod 22 also carries a resilient finger 23 which is adapted to be engaged by and moved in the same direction as the adjacent band 9, so that the appropriate terminal is displayed when the word in question (which is preferably located in the upper region of column 15) moves upwards into view in the aperture 6, the member 21 also being moved upwards. The member 21 is returned to its lower position to display the alternative terminal appropriate to the other word or words in the lower portion of column 15 when the member 22 is moved downwards. Similar effect may be obtained in an alternative manner by marking upon the member 21 the desired alternative terminal so that it can be moved into view or obscured as desired.

Inflections due to changes of case may be similarly varied to a limited degree, as for example to change the case of the word displayed in the aperture at the head of column 15 from nominative to accusative when the verb selected in column 13 is one which normally governs a noun in the accusative case. This may be achieved by the aid of a masking member 25 carried by a rod 26 longitudinally slidable on the cover 2 and adapted to be moved to display selected terminals on the associated overlapping portions of the bands appertaining to columns 15 and 16 in accordance with the selection of the words in column 13, the band appertaining to which is adapted to operate the rod 26 in a similar manner to that in which the rod 22 is operated as described above.

The device shown in FIGS. 1 to 3 can be employed both for translating English into German and vice versa, or it may be arranged to show simultaneously the translation of a word or phrase in normal spelling and the phonetic rendering thereof. This may be effected by utilizing the opposite side of the device, namely, by using the back 3 in a similar manner to the front 2, the endless bands 9 bearing not only translations of the words in the columns 11 to 17 (which occupy about half of the surface of the bands), but also these words themselves (or the phonetic equivalent of the translation thereof), arranged in similar order in the remaining half of the several bands, as seen at the cut-away portion of the front 2 shown in FIG. 1. Apertures 6' corresponding to the aperture 6 are formed in the back 3 of the casing 1, as indicated in FIG. 2. If the device is to be used for translations into English the aperture 6' on the opposite side of the casing to column 17 is masked and the aperture 6' on the opposite side of the casing to column 13 is unmasked. The translations of the words in columns 11 to 17 are also arranged in similar word order and disposition (although inverted) on the back 3 of the casing; while pins 8' attached to the bands 9 in corresponding positions half a band-length away from the respective pins 8 extend through longitudinal slots 7'.

With this construction the pins attached to the band will indicate in association with the columns of words on the front 2 and back 3 a word in language "A" on one side and the corresponding word in language "B" on the other side, while the phrase composed of the several selected words will be shown in language "B" in the apertures 6 on one side of the device and in language "A" in the apertures 6' on the other side of the device. (It will be understood that if preferred, instead of utilizing the reverse side of the device to indicate translations of one language into another it may be similarly utilized to show the phonetic version of the same words as are displayed with apertures on the front of the device, the bands being suitably lettered for that purpose.)

A further construction of translating device embodying similar principles to those involved in the construction shown in FIGS. 1 to 3 is shown in FIGS. 4 to 13. In this construction the longitudinally movable word-bearing elements consist of flat strips or combinations of flat strips, advantageously cut from sheets of plastic material. The casing of the device is formed in two parts 31, 32 one of which may slide telescopically into the other. The inner portion 32 is suitably compartmented to provide guideways in which the strip members 33, 34, 35, 36, 37 and 38 (see FIGS. 8 to 13) bearing columns of words in language "B" may slide.

The outer portion 31 of the casing is formed with longitudinal slots 39, and pins 40 attached to each of the members 33 to 38 as at 40' extend through said slots. Between the slots 39 are marked the corresponding columns of words in language "A", substantially as previously described above with reference to FIGS. 1 to 3. (Only a few of such words are indicated by way of example in the drawing.) The several columns on the casing portion 31 are indicated in the drawings by reference numerals 41 to 47, respectively. The back of the device is utilized in a similar manner to the front of the device, as in the construction shown in FIGS. 1 to 3 for the translation of words or phrases in language "B" to language "A", or it could if desired be utilised for translations from a third language "C" into another language.

The operation of the device shown in FIGS. 4–13 is substantially similar to that of the device shown in FIGS. 1 and 2. The casing portions being drawn apart as far as permitted by a limiting stop (not shown) the apertures 48 are uncovered. The pins 40 are moved along the slots until they are opposite to the words in the adjacent columns 41 to 47 comprising the phrase to be translated, the members 33 to 38 are correspondingly moved longitudinally and the translation may be read in the apertures 48.

FIGS. 8 to 13 show the individual sliding members 33 to 38, the casing 32 being indicated by broken lines so as to shown the relative positions therein of said members. Thus, the member 33, is formed with two fingers, one of which is opaque and bears the column of words, being translations of those in column 41, while the other finger is partially transparent and partially occupied by an opaque strip 50 which is adapted to mask portion of the underlying finger of member 34 when the member 34 is in a certain relative position. Again, the member 34 comprises three fingers, the middle one of which is opaque and serves as a mask for the underlying portion of member 35 while another of said fingers is transparent and merely serves to assist in guiding the member.

In the construction shown in FIGS. 4–13 the means for dealing with inflections is slightly different from that described above with reference to FIGS. 1 to 3, and is effected by masking portions of the members 35 and 38. Modifications of both articles and pronouns, as well as adjectives governed thereby are provided for. The articles and pronouns are arranged, with their alternative endings on member 36, while the adjectives with their corresponding endings are arranged on member 37. The member 38 which carries the nouns comprises appropriately windowed masking portions 38a, 38b which overlay the "terminal" portions of members 36 and 37, respectively, while the member 35 which carries the verbs has masking portions 35a, 35b also adapted to coincide with the "terminal" portions of members 36 and 37 and are windowed so as to permit the desired terminal to be viewed when a variation is dictated by the use of a particular verb.

The construction of the translation device shown in FIGS. 4 to 13 lends itself readily to the simultaneous representation of translations in normal spelling and phonetic spelling without necessarily bringing into use the reverse side of the device. Thus, as indicated diagrammatically in FIGS. 14, 15 and 16 the normal and phonetic spellings of each word in the columns upon the movable elements 33 to 36 may be superimposed one upon the other or placed in juxtaposition, the normal spelling being carried out in one primary colour (e.g., blue) and the phonetic spelling in a contrasting colour (e.g., red). By placing transparent red and blue colour filters alternately over the apertures 48 the phonetic spelling or normal spelling alone may be seen as desired, i.e., as indicated by FIGS. 15 and 16.

It will be evident that the utility of the device may be extended as desired by providing several complete sets of movable elements 33 to 38 with different choices of nouns, adjectives and verbs and corresponding word columns for application to the appropriate spaces between the slots 40, so that a very wide range of subjects can be dealt with.

By the provision of a casing of suitable depth several sets of movable elements may be stacked one upon another, each set advantageously comprising similar columns of words in a different language from the others.

Any desired set of movable elements may be brought into use, it being merely necessary for the sets of movable elements which are not required for use to be secured in their "idle" position, in which position a transparent window therein coincides with the aperture 48' (FIG. 17) of the casing 32' so as to permit the elements which are moved to be viewed through said aperture, as will be evident from the fragmentary cross-sectional view of such a device shown in FIG. 17.

FIGS. 18 and 19 show a construction of translating device according to the invention in which the movable elements bearing the columns of words to be translated take the form of tapes wound upon reels. In this construction the case 51 is substantially rectangular with semi-cylindrical ends to accommodate in a compact form the reels 52, 53 freely rotatable on spindles 54, 55. The casing 51 is formed with transversely disposed apertures 56 and 57 on opposite sides thereof and the tapes 58 wound upon and extending between each pair of reels 52, 53 are brought into proximity with said apertures by passing them over guide rollers 59.

The reels 52, 53 may be rotated manually by operation of the user's finger upon the knurled rims of the reels which project through slots 60 in the rounded ends of the casing 51. Spring fingers 61 extending between the wall of the casing 51 and the knurled edge of each reel 52, 53 act as a brake upon the rotation of the reels and prevent their accidental rotation. It is essential that the tapes 58 are maintained in a relatively taut condition, and this is effected by passing the tapes between transverse guide members 62 supported between each pair of the reels 52, 53 and by jockey rollers 63 by which a light tension is always maintained on the tapes. The rollers 63 are carried upon the bent arms 64 pivoted on the axles of the guide rollers 59 and tensioned by springs 65. The free ends of the arms 64 extend adjacent to the rim of the adjacent reel 52 or 53 and carry an abutment 66 adapted to engage between the teeth of an internally toothed projecting annulus 67 adjacent to the rim of each wheel. When so engaged the reel can only be turned by applying a very positive effort which may force the abutment 66 to ride over the teeth of the annulus 67. (The tensioning and locking mechanism of the reels 52, 53 is for the most part omitted from FIG. 18 in the interest of clarity, but is shown in FIG. 19.) Instead of the annulus 67 having teeth it may be relatively smooth and afforded merely frictional engagement with the abutment 66.

With the construction described it is not possible for the tapes 58 to become slack, since rotation of the reels in a direction other than that which places a tension on the tape, is prevented by the locking abutment 66 which can only be disengaged to permit the appertinent reel to rotate freely when the tape 58 is tightened and tends to move the arm 64 against the action of the spring 65 attached thereto.

With this construction of the device the words of language "A" are depicted on one side of the tape 58 while the translations thereof in language "B" are marked on the other side of the tape, the two versions of each word being relatively displaced a distance equal to the length of tape between the centre of the lap around the two rollers 59. Thus, whenever a word is visible at one of the apertures 56 or 57, the translation thereof will appear at the other aperture 57 or 56, respectively.

As the full complement of words on each tape 58 cannot be viewed at one and the same time it is a practical necessity for the words in at least one of the languages to be arranged more or less alphabetically so that the user may know which way to turn the reels to bring any particular word into view. It will also be necessary to know what types of words are carried on the different tapes, but this is a matter with which the user will quickly become familiar.

The device constructed as described with reference to

FIGS. 18 and 19 is not adapted to deal with declensions of articles, pronouns and adjectives in the manner above described with reference to the construction shown in FIGS. 1 to 3 and FIGS. 4 to 13, but this may be provided for in an alternative manner which is in fact more comprehensive than the methods previously described above.

Reference is had to FIGS. 20 to 24, in which FIGS. 20 and 21 show means for dealing with genders and FIGS. 22 and 24 with inflections due to changes of case, these figures being to some extent diagrammatic.

As shown in FIGS. 20 and 21, between the guide roller 59 and the casing 51 is mounted on said casing and apertured slide 70, vertically slidable in guides 71 and connected to the armature of a solenoid 72. A compression spring 73 tends to move the slide upwards while the solenoid, when energized, tends to move it downwards. The movement of the slide may be arrested in any of three positions as determined by the abutments 74 and 75, the former of which is fixed while the latter is mounted upon an arm 77 pivoted upon a pivot pin 79 and associated at its upper end with an electro-magnet 81. The abutments 74 and 75 are adapted to engage in a slot 82 formed in an upper extension of the slide 70.

The slide 70 has three apertures 83, 84, 85 adapted to register with the aperture 56 in which adjectives are normally displayed by the appertinent tape, in the three alternative positions of the slide 70. In FIG. 20 the slide 70 is shown in its middle position, in which it is located by the engagement of the abutment 75 in the slot 86. For this purpose both the solenoid 72 and the electro-magnet 81 must be energised to bring the abutment 75 into the slot 82 and to draw the slide downwards as far as permitted by said abutment. If the solenoid 72 and electro-magnet 81 are de-energised the slide 70 will move upwards under the action of its spring 73 until its further upward movement is arrested by the fixed abutment 74. In the latter position of the slide 70 the aperture 85 therein will coincide with the aperture 56. Similarly, if the solenoid 72 is energised without the electro-magnet 81 being also energised the slide 70 will be drawn downwards until its movement is arrested by the abutment 74. In this position the aperture 83 will coincide with the aperture 56 in which an adjective is displayed.

It will be observed from FIG. 20 that the aperture 83 extends beyond the aperture 84 at one side, while the aperture 85 extends beyond the aperture 84 at the other side. Moreover, the slide 70 has further small apertures 88, 89 and 90, 91 which are staggered. It will be evident that as the slide 70 is moved into its alternative positions the apertures 88, 89, 90, 91 as well as the apertures 83, 84 and 85 disclose whatever lies beneath them in the apertures 56 as they come respectively into line with the latter.

What lies beneath the casing 51 in the vicinity of the apertures 56 is represented in FIG. 22. Beneath the left hand aperture 56 shown in FIG. 20 lies a tape 58 which carries the translations (in German) of articles and pronouns (including relative pronouns), these words being made up of the stem of the word and followed by the three terminals in their masculine, feminine and neuter genders, respectively. The various cases which may apply to the articles or pronouns in question are each represented. The rectangle 92 of broken lines shown on the left hand of FIG. 22 shows for convenience the English translations of the German words on the adjacent tape 58, but in fact said English words will be printed on the opposite side of the tape 58 as will be understood from the foregoing description of FIGS. 18 and 19. The apertures 88, 89 and the adjacent end portion of apertures 83 are, respectively, in line with the three alternative terminals of the tape 58 therebeneath, but only that terminal will be shown which coincides with the aperture 56 and one of the apertures 88, 89 or 83, simultaneously.

Two further tapes 58a and 58b are shown in FIG. 22, the first bearing translations of adjectives and the latter translations of nouns. Between the tapes 58a and 58b is rotatably mounted a cylinder 95 on the periphery of which are marked the various series of inflections, masculine, feminine and neuter in the various different cases, five possible variations being represented in the drawing. FIG. 25 represents a development of the portion of the surface of the cylinder 95 bearing said terminals. The only terminal that will be displayed at any one line, however, is that which is in register with the aperture 56 and the apertures 90, 91 or 85 for the time being coincident therewith.

The positioning of the slide 70 according to whether the noun on the tape 58b appearing in the aperture 56 is of masculine, feminine or neuter gender is effected by means of two contact fingers 96, 97 which press lightly upon opposite marginal portions of the tape 58b, which latter are formed with notches 98, 99 on one side or the other according to whether the adjacent noun is of feminine or neuter gender. For masculine nouns no notch is made in the tape. When a finger 96 or 97 makes contact with the metal surface of the roller 59 over which the tape 58b runs an electric circuit is completed through the solenoid 72. In the case of one finger, namely the finger 96 which cooperates with the notch 98 indicating feminine gender a circuit is also completed through the electro-magnet 81, thereby bringing the abutment 75 into operation. Thus, when a masculine noun coincides with the aperture 56 the slide 70 remains in its uppermost position. When a feminine noun appears the slide 70 is drawn down until arrested by the abutment 75, while if a neuter noun appears the slide 70 is drawn down until arrested by the stop 74.

According to the position of the slide 70, the appropriate masculine, feminine or neuter terminal for the word on tape 58 in register with the aperture 56 will be displayed. A corresponding masculine, feminine or neuter terminal will also be displayed upon the cylinder 95 following the adjectival stem on the tape 58a. The correct terminal corresponding to the case of the selected word on the tape 58 has, however, still to be determined, as follows.

Five alternative combinations each consisting of three terminals are shown by way of example. The cylinder 95 therefore must be located in any one or other of five angular positions. The cylinder 95 is constantly urged in a clockwise direction (as seen in FIG. 24) by a spiral spring 100. It normally rests with its radial projection 101 against a stop 102. In this position the terminals E, E, E are coincident with the aperture 56, representing the adjectival endings when the adjective is preceded by the definite article in the nominative case.

Electro-magnets 103, 104, 105 and 106 are each adapted, when energised, to extend a stop into the path of the projection 101 if the cylinder 95 is rotated anti-clockwise from its position of rest. Such rotation may be brought about by means of a cord 107 wrapped around the axle of the cylinder 95 and connected to the armature of a solenoid 108. The latter, as well as the electro-magnets 103 to 106 are in circuit with contact fingers 109 to 112 which bear lightly upon the tape 58 at points laterally spaced thereon, separate contact fingers appertaining to the separate electro-magnets.

The tape 58 is formed with apertures 113 at selected points on the surface thereof, the position of the apertures being chosen according to the nature of the adjectival declensions appropriate to the case of the adjacent word on the tape 58. Thus, if the translation for the indefinite article "A" in the nominative case is required the contact finger 111 will make contact, through the aperture 113, with the roller 59 over which the tape passes, thereby causing the electric circuit to be completed both through the solenoid and the electro-magnet 104. The cylinder 95 will thereby be rotated until arrested by the abutment of the projection 101 against the stop brought into operative position by the electro-magnet 104, and the terminals "ER", "E", "ES" will be in registration with the aperture 56, and the slide 70 being in position to select a feminine terminal, will permit the terminal "E" to be displayed.

The operation of the device may be further extended to take into consideration plural nouns, as will be obvious from the foregoing description.

It will be evident from the foregoing that the invention may be carried into practice in various ways employing mechanical, electrical, magnetic or optical means for moving, locating and displaying the elements and coupling them where necessary, the details of construction being varied as may be expedient. The invention provides a simple and useful device for use in translation from practically any given language into any other with great ease and convenience and avoids the tedious work normally involved when dictionaries are used for this purpose.

The expression "words" is used above in its broadest sense and includes devices intended to represent words or sounds, for example pictorial representations of the sign language of the so-called "deaf and dumb alphabet"; invisible records of words or sounds which may be made audible or visible by the aid of known reproduction devices are also within the ambit of this expression.

We claim:

1. A translation device comprising a casing, a pair of parallel spindles mounted therein, a series of rollers independently rotatable on each spindle, a flexible endless band bearing a primary column of words on half of each band disposed around each pair of rollers, an aperture on one side of the casing extending transversely of said bands, a second aperture on the opposite side of the casing extending transversely of said bands, a second primary column of words on the other half of each band, slots in each side of the casing parallel and adjacent to each band, a pin connected to each band extending through the adjacent slot, secondary columns of words on the casing adjacent each slot, said secondary words being interpretations of the words upon the portions of the bands adjacent the respective slots and movable in coincidence with the aperture on the same side of the casing, and arranged in corresponding order, two secondary non-adjacent columns containing a pair of the same words and the two associated primary non-adjacent columns containing the same interpretation therefor, the setting of the pin of one of said two primary columns at one of said pair of words causing the appearance in its aperture of the corresponding interpretation on the other of said two primary columns.

2. A translation device comprising a casing, a series of elongated elements mounted in parallel relation and relatively longitudinally movable in said casing and bearing primary columns of word indications, apertured masking means extending transversely of said elements, a corresponding series of secondary columns of word indications, being interpretations of said primary columns and arranged in corresponding order thereto on said masking means, means for moving said elements to bring any selected word thereon into coincidence with an aperture of said apertured masking means, means connecting two non-adjacent elements for movement together, and indicating means associated with said elements and movable relatively to the secondary columns of word indications in unison with the movement of the respective elements for simultaneously indicating the word in said secondary column corresponding to said selected word of the primary column coincident with said aperture, two secondary non-adjacent columns containing a pair of the same words and the two associated primary non-adjacent columns containing the same interpretations therefor, the setting of the pin of one of said two primary columns at one of said pair of words causing the appearance in its aperture of the corresponding interpretation on the other of said two primary columns.

3. A translating device comprising in combination a casing, a series of elongated elements mounted in parallel relation and relatively longitudinally movable in said casing, each of said elements bearing a primary column of word indications, apertured masking means on said casing extending transversely of said elements, said primary columns of word indications comprising two alternative forms of words represented in contrasting colours, corresponding colour filters movably mounted on said casing for movement into positions respectively coincident and non-coincident with the aperture of the masking means, a corresponding series of secondary columns of word indications, being interpretations of said primary columns arranged in corresponding order thereto and in parallel relation therewith on said masking means, means for moving said elements to position any selected word indication thereon into coincidence with said aperture, and indicating means associated with said elements and movable relatively to the secondary columns of word indications in unison with the movement of the respective elements for simultaneously indicating the word in said secondary column corresponding to said selected word of a primary word column coincident with said aperture.

4. A translating device comprising in combination a casing, a series of elongated elements mounted in parallel relation and relatively longitudinally movable in said casing and bearing primary columns of word indications, an aperture in the casing extending transversely of said elements, a corresponding series of secondary columns of word indications, being interpretations of said primary columns and arranged in corresponding order thereto on said casing, means for moving said elements to bring any selected word thereon into coincidence with said aperture, masking means partially overlapping said aperture and movable longitudinally of the casing in association with alternative terminations of word indications in a primary column, means operatively connecting the auxiliary masking means and an elongated element, means for moving said elements to bring any selected word thereon into coincidence with said aperture, and indicating means associated with each of said elements and movable relatively to the secondary column of word indications in unison with the movement of the respective elements for simultaneously indicating the word in said secondary column corresponding to said selected word of a primary word column coincident with said aperture.

5. A translating device comprising in combination a casing, a series of elongated elements mounted in parallel relation and relatively longitudinally movable in said casing and bearing primary columns of word indications, said casing being apertured transversely of said elements, a corresponding series of secondary columns of word indications, being interpretations of said primary columns and arranged in corresponding order thereto and spaced therefrom on said elements, means for moving said elements to bring any selected word thereon into coincidence with an aperture of the casing, masking means partially overlapping the casing aperture and movable relatively thereto, a member in the casing bearing alternative word forms movably mounted in the casing in proximity to said aperture and movable masking means, means for moving said elements to bring any selected word thereon into coincidence with said aperture, means responsive to the movements of said element to adjust said member and masking means to vary the word form coincident with said aperture in accordance with the positions of said elements, and indicating means associated with each of said elements and having relative motion with respect to the secondary column of word indications in unison with the movement of the respective elements for simultaneously indicating the word in said secondary column corresponding to said selected word of a primary word column coincident with said aperture.

6. A translating device comprising in combination a casing, a series of elongated elements mounted in parallel relation and relatively movable longitudinally within said casing and bearing primary columns of word indications, said casing being apertured transversely of said elements to disclose portions of the elements coincident therewith, a corresponding series of secondary columns of word indications, being interpretations of said primary columns and arranged in corresponding order thereto and spaced therefrom on said elements, means for moving said elements to bring any selected word indication into coincidence with said casing aperture, a disc rotatably mounted in the casing adjacent to said aperture and bearing a series of alternative word forms, an apertured mask for said aperture slidably mounted upon the casing, electro-magnetic means for operating said disc and mask, electrical contact means associated with said electro-magnetic operating means and with the elongated elements and operable in accordance with the position of said elements to vary the word terminations disclosed in said aperture, and indicating means associated with each of said elements and having relative motion with respect to the secondary column of word indications in unison with the movement of the respective elements for simultaneously indicating the word in said secondary column corresponding to said selected word of a primary word column coincident with said aperture.

References Cited in the file of this patent

UNITED STATES PATENTS

| | | |
|---|---|---|
| 527,964 | Gifford | Oct. 23, 1894 |
| 688,388 | Cartwright | Dec. 10, 1901 |

FOREIGN PATENTS

| | | |
|---|---|---|
| 68,881 | Austria | June 10, 1915 |
| 3,628 | Great Britain | 1888 |
| 26,656 | Great Britain | 1909 |
| 126,497 | Great Britain | May 15, 1919 |
| 264,062 | Italy | Oct. 28, 1927 |